US007006987B1

(12) United States Patent
Xie et al.

(10) Patent No.: US 7,006,987 B1
(45) Date of Patent: Feb. 28, 2006

(54) EFFICIENT IMPLEMENTATION OF AN AUCTION PROXY BID ENGINE

(75) Inventors: Ying Xie, San Jose, CA (US); Elaine Chien, Santa Clara, CA (US); Peter C. Williams, Santa Cruz, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 648 days.

(21) Appl. No.: 09/712,935

(22) Filed: Nov. 15, 2000

(51) Int. Cl.
*G06F 17/60* (2006.01)

(52) U.S. Cl. ........................................................ 705/26

(58) Field of Classification Search .................. 705/26, 705/27

See application file for complete search history.

(56) References Cited

FOREIGN PATENT DOCUMENTS

JP 2002-163488 * 7/2002

OTHER PUBLICATIONS

No Author, "Bid.com Launches Personalized Marketing Service For Its Customers; Use of Net Perceptions Real-time Recomendation Engine a First for Online Auctions", Business Wire, Nov. 5, 1998. Retreived from ProQuest Jun. 10, 2005.*

* cited by examiner

*Primary Examiner*—Wynn W. Coggins
*Assistant Examiner*—Naeem Haq
(74) *Attorney, Agent, or Firm*—Kent A. Lembke; William J. Kubida; Hogan & Hartson LLP

(57) ABSTRACT

The invention provides a system and method for determining the winner or winners of an on-line auction accepting proxy bids. Proxy bids are bids that do not have a bid price, but instead have ceiling price that indicates the highest price a bidder is willing to bid for goods. The system and method according to the invention are able to sort the bids from highest to lowest and determine a winner or winners depending on the amount of goods being offered for sale. The system then generates a winning bid price by determining the lowest bid required to win the auction. The winning bidder or bidders pay this winning bid price.

3 Claims, 4 Drawing Sheets

EFFICIENT IMPLEMENTATION OF AN AUCTION PROXY BID ENGINE

BACKGROUND OF THE INVENTION

1. Field of the Invention

The invention relates to on-line auction management. More specifically, the invention provides a system and method for efficiently determining the winning bidder and winning price for goods offered for sale in an on-line auction environment.

2. Discussion of the Related Art

Traditional auctions generally consist of a physical gathering that requires the presence of all bidders. The goods being offered for sale must generally be physically present at the auction location for inspection by potential bidders and pick-up by the buyers. An auctioneer solicits bids from the floor for a given item or set of items, however, once the highest bid is accepted, the sale is closed and the next set of goods is brought to the floor. Thus, determining the winner of a conventional auction does not require significant effort because the winner is simply the person to bid the highest amount, i.e., typically the last bid.

The emergence of on-line auctions has significantly expanded the scope of auction formats available, the number of bidders that an auction can support, as well as the number of goods that may be auctioned off during an auction session.

One type of auction format supported on-line is the English auction, which generally relies upon the submission of ascending bids with the highest bidder winning the auction. Other types of actions supported on-line include reverse auctions and sealed auctions.

There are also several different techniques for bidding in an auction. Typically, the bidding simply ascends to a final sale price. Alternatively, in a reverse auction format, the bidding begins with a ceiling price and bidder's proceed from that price. Proxy bids are another variant on bidding. A proxy bid is a bid that doesn't have a bid price, instead the proxy bid is an indicator of the upper limit the bidder is willing to offer. Thus, as the bids ascend from a base price, a bidder submitting a proxy bid will win the auction if no one has bid higher than his or her proxy bid.

In the on-line auction environment, the auction engine is tasked with determining the winner. In a proxy bid format auction, the auction engine determines the winning price as the lowest price that would allow the bidder to win the auction, but not higher than the limit price For example, in a one-item auction with a bid increment of $1, if a bidder has a proxy bid with a limit price of $50, and someone else has a bid price of $30, the auction engine should bid $31 for the proxy bid, so that the highest bidder (the person bidding $50) wins the auction without paying any more than needed to win the auction.

SUMMARY OF THE INVENTION

The proxy bid format described above can be expanded to include many bidders bidding for multiple quantities of goods. This significantly complicates the operation of conventional auction engines because these engines determine the winners by having each bid compete with every other bid one increment at a time. This approach requires significant computing resources on the part of the auction engine when there are many bidders and/or when the bidding increments are small.

The invention solves the problems associated with proxy bids in the on-line environment by providing an efficient auction engine. The auction engine according to the invention receives multiple proxy bids and determines the winner or winners, as well as the winning price. The auction engine according to the invention first sorts the proxy bids to determine the order of the bids, from the highest to lowest proxy bid. Then, depending on the proxy bid and the quantity of goods desired by each of the bidders, the auction engine according to the invention determines the winner or winners of the auction, along with the winning sale price.

To achieve these and other advantages and in accordance with the purpose of the invention, as embodied and broadly described herein, the invention provides a system that receives at least one proxy bid by at least one proxy bidder, sorts the received proxy bids in descending order; determines the winner or winners of the auction and generates the winning price to be paid by the winning bidder or bidders.

These and other features and advantages of this invention are described and are apparent from the following detailed-description of the preferred embodiments.

BRIEF DESCRIPTION OF THE DRAWINGS

The preferred embodiments of the invention will be described in detail, with reference to the following figures wherein.

DETAILED DESCRIPTION OF THE PREFERRED EMBODIMENTS

Figure 1:
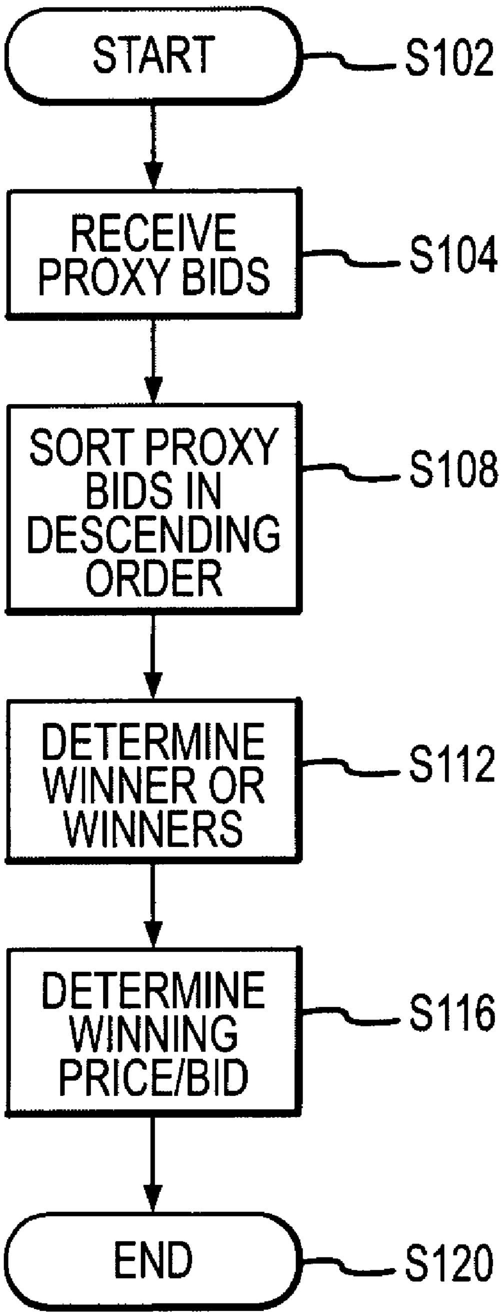
FIG. 1 shows the process for determining the winner or winners of an on-line proxy bid auction according to an embodiment of the invention.

FIG. 1 shows the process for determining the winner or winners and winning price in an on-line auction that accepts proxy bids according to an embodiment of the invention. In FIG. 1, the process begins with step S102 and then moves to step S104. In step S104, the system receives the proxy bids. The bids may be received through a variety of sources as will be described in greater detail below. The process then moves to step S108. In step S108, the system sorts the proxy bids in descending order from the highest bid to the lowest. The process then moves to step S112.

In step S112, the system determines the winner or winners of the auction. As will be described in greater detail below, winners are determined based upon the highest proxy bid received, as well as the quantity of goods requested. For example, there can be more than one winner if the winning bidder does not want the entire quantity of goods offered for sale. In that case, subsequent bidders may also win the auction. As an example, if there are three highest bidders B1, B2 and B3, and each bidder wanted 2, 3 and 2 items, respectively, and if there are a total of 5 goods available, B1 and B2 are considered winning bidders because each receives their desired quantity of goods.

In step S116, the system determines the winning price. In other words, the system determines the price for which the goods will be sold. The invention contemplates several techniques for determining the winning price. However, in general, the winning price will be the highest losing bid plus an increment. In other words, if the highest losing bid is $20, the system will generate a winning bid that is higher than $20, for example, $21. This bid will be the winning bid price that all of the winners will pay, regardless of their individual bid.

Figure 2:
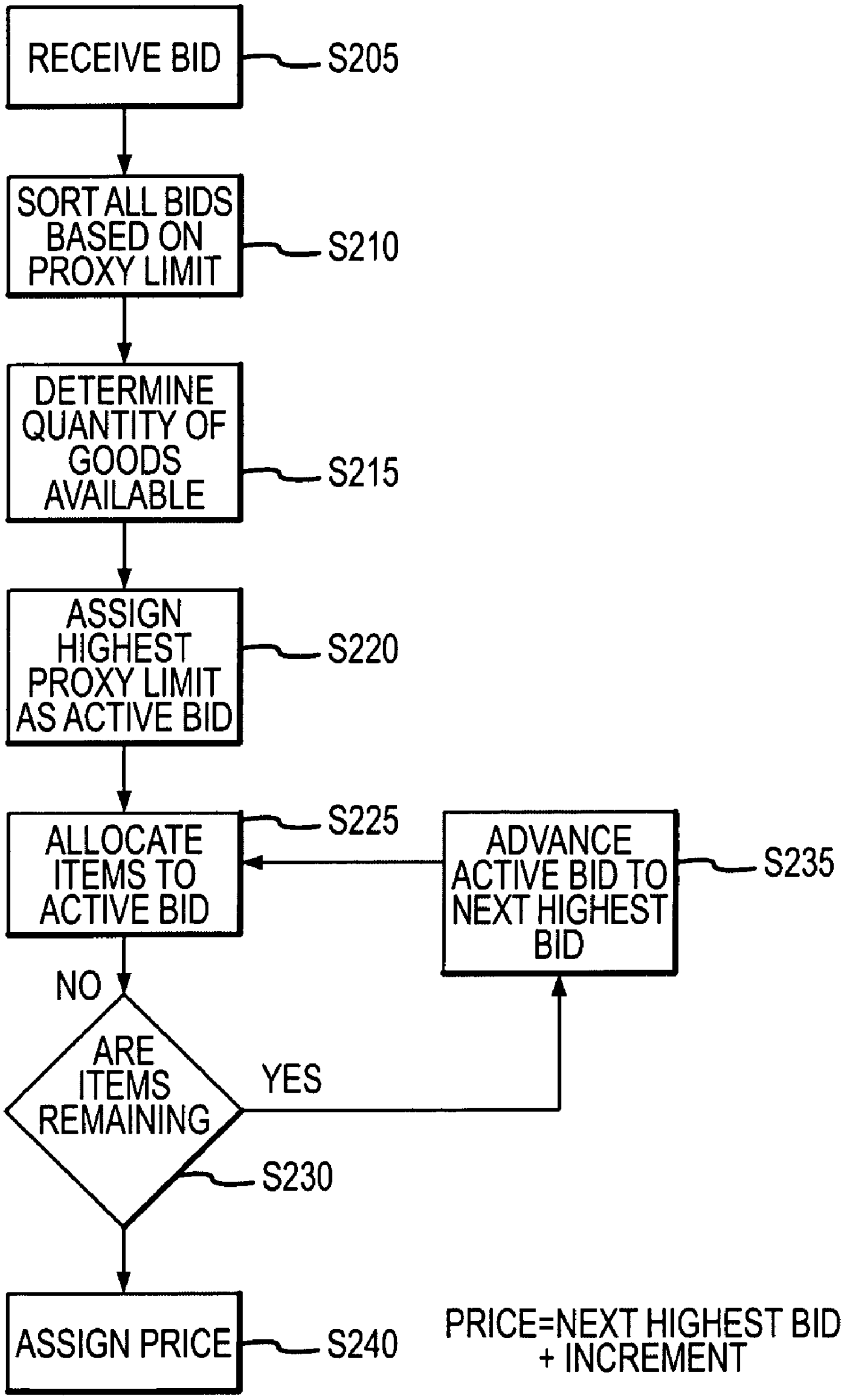
FIG. 2 shows the process of FIG. 1 in greater detail.

FIG. 2 shows the process shown in FIG. 1 in greater detail. In step S205, the system receives the bids. The process then moves to step S210. In step S210, the system sorts all of the bids based upon the proxy bid's limit price. In other words, the bids are sorted from the highest bid to the lowest. The process then goes to step S215. In step S215, the system determines the quantity of goods available for sale. The process then moves to step S220.

In step S220, the system designates the highest proxy bid as the "active bid." The process then moves to step S225. In step S225, the system allocates to the "active bid", or the highest bidder, the number of goods requested by the highest bidder. Thus, the highest bidder is allocated the exact number of goods that he or she wants as long as that many goods are available. The process then goes to step S230.

In step S230, the system determines whether any goods remain for sale after the highest bidder has been allocated the amount of goods that he or she has sought. If there are no additional goods, the process moves to step S240. Otherwise, the process moves to step S235. In step S235, the system advances the "active bid" designation to the next highest bidder. In other words, the next highest bidder is designated as the "active bid" after goods have been allocated to the previous "active bid." The process then goes to step S225 where goods are allocated to the "active bid." The process then goes to step S230 where the system determines whether there are any items remaining. If there are items remaining, the process returns to step S235. Otherwise, the process goes to step S240. Therefore, the system in effect establishes a loop whereby goods are allocated to bidders in order of descending bids until all of the goods have been allocated.

In step S240, the system determines the sale price. In the embodiment shown in FIG. 2, the price is assigned by determining the highest price offered paid by a losing bidder and adding an increment to this value. Thus, if the highest losing bid has a proxy limit of $50, the sale price will be $50 plus an increment. The increment can be preset by the system and may be, for example, one cent, one dollar, etc.

Figure 3:
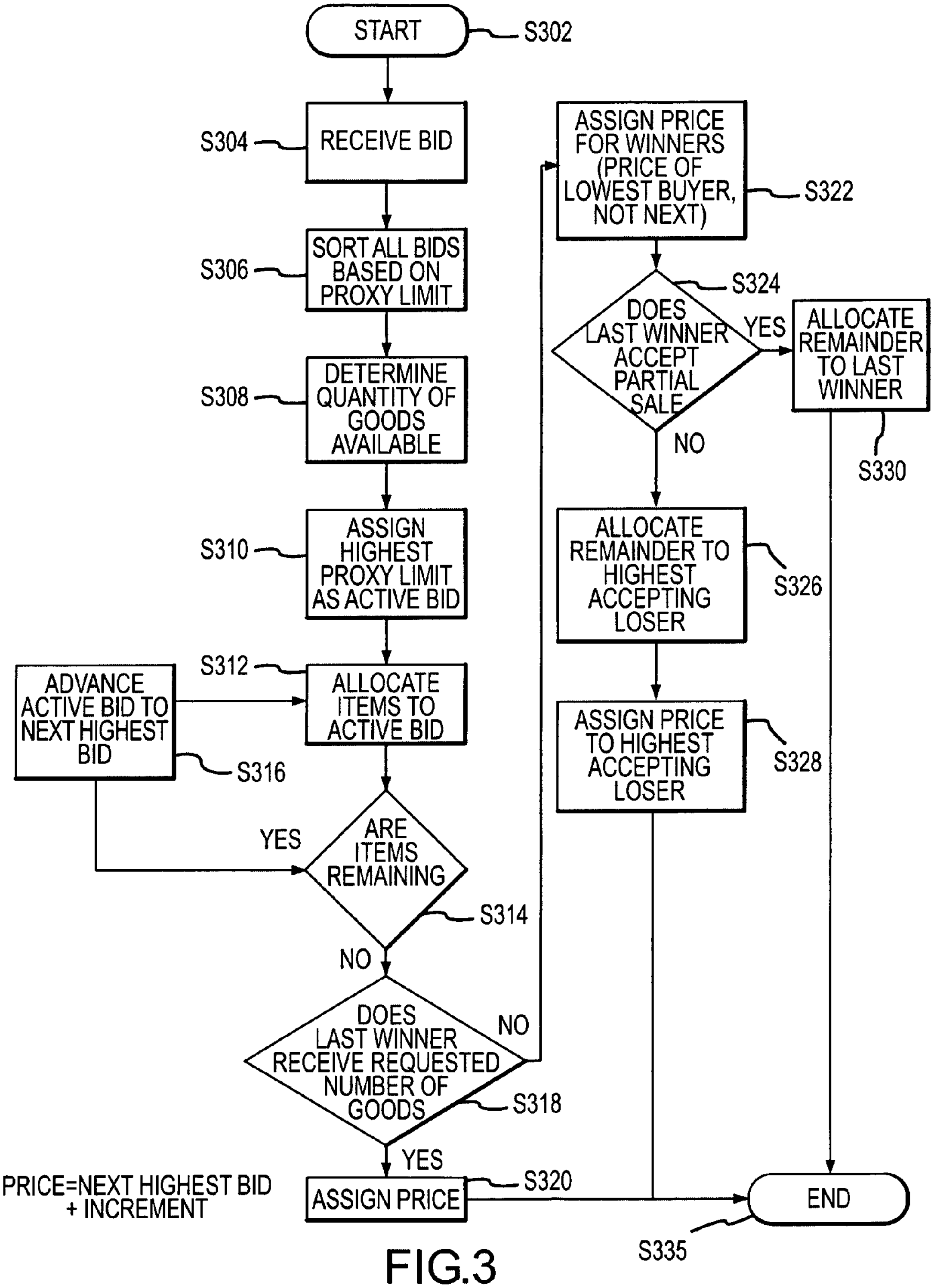
FIG. 3 shows another embodiment of the process according to the invention.

FIG. 3 illustrates the process according to another embodiment of the invention. In this embodiment, the system accounts for the situation where there are not enough goods to satisfy the quantity of goods requested by each of the auction winners.

In FIG. 3, the process begins with step S302 and moves to step S304. In step S304, the system receives proxy bids from at least one bidder. The process then moves to step S306. In step S306, the system sorts the bids in order of descending proxy bids. The process then moves to step S308.

In step S308, the system determines the quantity of goods that are available for sale. The process then moves to step S310. In step S310, the system designates the highest proxy bid as the "active bid." The process then goes to step S312. In step S312, the system allocates goods to the "active bid." In other words, if the highest bidder, designated as the "active bid" wants 4 items, the system allocates 4 items to the buyer designated as the "active bid." The process then goes to step S314.

In step S314, the system determines whether there are any goods remaining. If there are no additional goods remaining, the process goes to step S318. Otherwise, the process goes to step S316. In step S316, the system advances the "active bid" to the next highest bid. In other words, if the highest bid was $50 and that bid was allocated goods in step S312, the next highest bid is designated as the "active bid" in step S316. The process then moves to step S312 where goods are allocated to the newly designated "active bid." The process then moves to step S314 where the system determines whether there any goods remaining for sale. If there are additional goods for sale, the process returns to step S316 and this loop continues until all of the items have been allocated to winning bidders. When all of the goods have been allocated, the process moves to step S318.

In step S318, the system determines whether the last "active bid" i.e., or last winner, receives the number of goods that he or she requested. If the last winner does receive the number of goods that he or she requested, the last winner is considered satisfied and the process moves to step S320. Otherwise, the process moves to step S322.

In step S320, the system determines the winning price. The winning price is assigned by determining the highest price offered by a losing bidder and adding an increment to this value. Thus, if the highest losing bid is $50, the sale price will be $50 plus an increment. The increment can be preset by the system and may be, for example, one cent, one dollar, etc. Once the system determines the winning price, the process moves to step S335 and ends.

In step S322, the system must account for the fact that one of the winners is not satisfied, that is, there are not enough goods to meet the requests of all of the winning bidders. Thus, in step S322, the system first assigns a winning price. For the last winner, the winning price is his or her proxy limit price, for the other winners, the winning price is the highest losing proxy bid plus an increment. The process then moves to step S324. In step S324, the system determines whether the last winner, i.e., the winning bidder that bid the lowest amount in comparison to the other winning bidders, accepts the partial sale. In other words, if the lowest winning bidder requested 10 items but only 5 items are available, the system determines whether the lowest winning bidder will accept the 5 items (i.e., a partial sale). If the lowest winning bidder does not accept the partial sale, the process moves to step S326, otherwise the process moves to step S330.

In step S330, because the last winning bidder is willing to accept fewer goods than he or she originally sought, the system allocates the remaining goods to the last winning bidder. The sale price was the price determined in step S322, so the process then goes to step S335 and ends.

In step S326, the system allocates the remaining goods to the first losing bidder, i.e., the bidder who bid the highest losing bid, and who is willing to accept the quantity of goods that are available. The process then moves to step S328. In step S328, the system assigns a price for goods accepted by the highest bidding losing bidder. The sale price will be the exact price bid by the highest bidding losing bidder. The process then goes to step S335 and ends.

Figure 4:
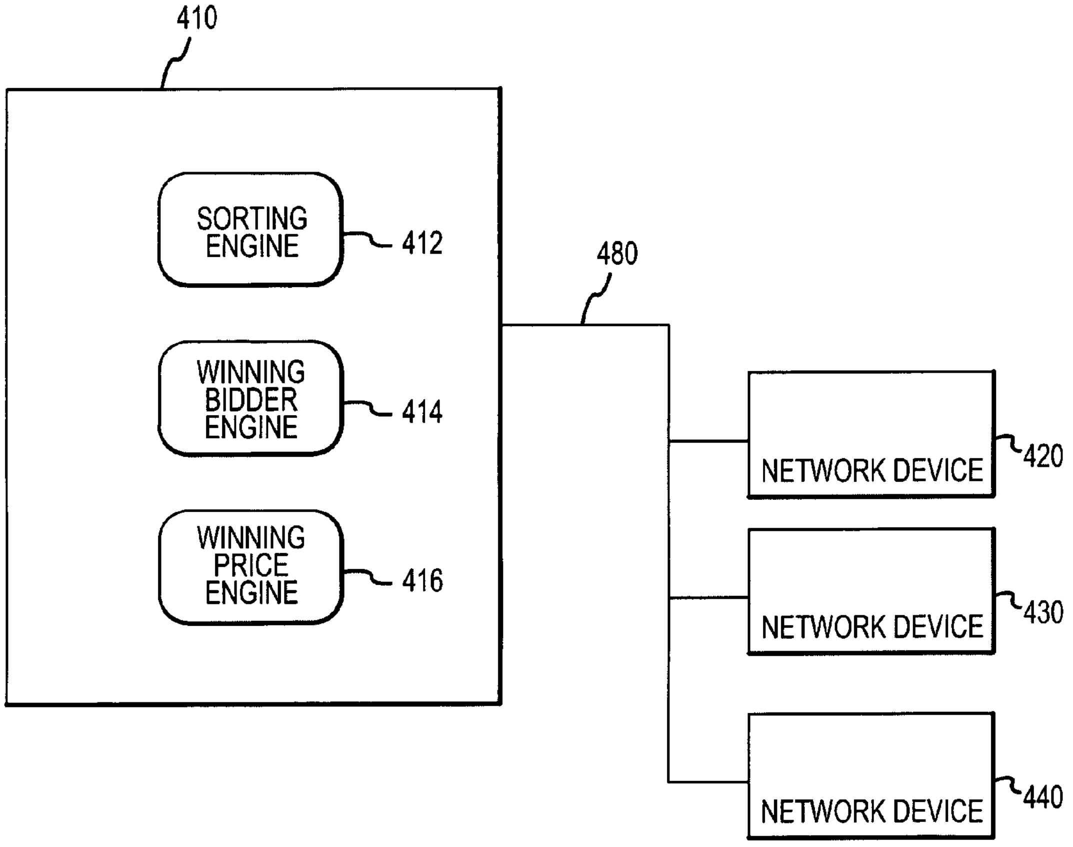
FIG. 4 shows an exemplary block diagram of the system according to an embodiment of the invention.

FIG. 4 shows an exemplary block diagram of a system according to one embodiment of the invention for carrying out the process described above. FIG. 4, shows an auction engine 410 coupled across a network connection 480 to network devices 420, 430 and 440. The network connection may be known networks, including a local area network or the Internet. The auction engine houses a sorting engine 412, a winning bidder engine 414 and a winning price engine 416.

In operation, the auction engine is capable of receiving input from the network devices 420, 430 and 440. The network devices may include any number of network communications devices, including workstation having a monitor and key board or an Internet appliance. The network devices 420, 430 and 440 can be used to communicate a proxy bids from a plurality of bidders. The bids are transmitted over the communications network and are received by the auction engine 410.

The sorting engine 412 sorts the bids in descending order, i.e., from the highest proxy bid to the lowest. The winning bidder engine 414 then determines the winner or winners of the proxy bid auction. As was described earlier, determining the winner or winners of the proxy bid auction is a function of the quantity of goods available. If there are more goods available for sale than the highest bidder is seeking, then the second highest bidder is also deemed a winner because there are goods available to satisfy the second highest bidder's request.

The winning price engine 416 then determines the winning price, i.e., the price at which the goods will be sold to the winning bidder or bidders. The process for determining the winning price was discussed earlier in connection with embodiments of the invention. In general, if all of the winning bidders receive the quantity of goods that they were seeking, then the sale price is the value of the highest losing bid price, plus an increment over that price, i.e., one dollar, one cent or any other monetary unit. If there is an unsatisfied winning bidder (a bidder for which there are not enough goods to satisfy the bidder's quantity request), then the system allows the unsatisfied bidder to attempt to bid up the price to out bid the other winning bidders, accept the number of goods available or decline to carry out the purchase. If the unsatisfied bidder accept the available goods, then the winning bid price described above will be the sale price. If the unsatisfied bidder declines the available goods, the system offers the goods to the losing bidder who bid the highest losing bid. Once the system finds the highest bidding losing bidder who is willing to accept the goods available, a sale is made and this bidder pays the exact same price as his or her proxy bid.

It is important to note that the block diagram above is merely illustrative of one embodiment of a system for carrying out the invention disclosed and claimed herein. Numerous variations are possible and are contemplated by the invention, including various types of communications networks, various systems for bidders to bid on goods, and various processing mechanisms for carrying out the functions of the auction engine 410.

While specific embodiments of the invention have been described herein, it will be apparent to those skilled in the art that various modifications may be made without departing from the spirit and scope of the invention.

What is claimed is:

1. A computer-based method for conducting an on-line auction of a quantity of goods, comprising:

from a communications network, receiving with an auction engine running on a computer device communicatively linked to the communications network a plurality of proxy bids comprising a limit price and a requested quantity;

sorting with the auction engine the proxy bids in a descending order based upon the limit prices for the prow bids;

operating the auction engine to determine at least one winner of the on-line auction comprising:

based on the descending order, assigning a winning bidder designation to a first highest one of the proxy bids;

from the quantity of goods, allocating the requested quantity of the proxy bid of the winning bidder to the winning bidder;

when the quantity of goods is greater than zero, assigning a next winning bidder designation to a next highest one of the proxy bids and repeating the allocating of the requested quantity;

after the winner determining, generating with the auction engine a winning sale price to assign to each of the winning bidders, wherein the step of generating the winning sales price further includes:

determining from the descending order a highest losing proxy bid after a last selected one of the next winning proxy bids;

determining the limit price of the highest losing proxy bid; and incrementing the limit price of the highest losing proxy bid by a predetermined increment level to assign the winning sales price with the auction engine and wherein a bidder associated with one of the winning proxy bids declines the allocated goods;

allocating a portion of the requested quantity of the proxy bid of the highest losing proxy bid to the highest losing proxy bid; and generating with the auction engine a second winning sale price for the highest losing proxy bid that is equivalent to the limit price of the highest losing proxy bid.

2. The method according to claim 1, wherein the predetermined increment level is a monetary unit.

3. The method according to claim 1, wherein the predetermined increment level is one dollar.

* * * * *

UNITED STATES PATENT AND TRADEMARK OFFICE

CERTIFICATE OF CORRECTION

PATENT NO. : 7,006,987 B1 
DATED : February 28, 2006
INVENTOR(S) : Ying Xie, Elaine Chien and Peter C. Williams It is certified that error appears in the above-identified patent and that said Letters Patent is hereby corrected as shown below:

<u>Column 6,</u>
Line 11, “prow” should be -- proxy --.
Line 18, “quantity of the proxy” should be -- quantity of the proxy bid of the winning bidder to the winning bidder; --.
Line 19, “bid of the winning bidder to the winning bidder;” should be -- quantity of the proxy bid of the winning bidder to the winning bidder; --.

Signed and Sealed this

Second Day of May, 2006

JON W. DUDAS
*Director of the United States Patent and Trademark Office*